United States Patent
Iwamoto et al.

(10) Patent No.: US 7,609,515 B2
(45) Date of Patent: Oct. 27, 2009

(54) INFORMATION PROCESSING APPARATUS

(75) Inventors: Akira Iwamoto, Osaka (JP); Hitoshi Nakatani, Osaka (JP); Shintaro Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/202,828

(22) Filed: Sep. 2, 2008

(65) Prior Publication Data

US 2009/0059505 A1 Mar. 5, 2009

(30) Foreign Application Priority Data

Sep. 3, 2007 (JP) ............................. 2007-227733

(51) Int. Cl.
*G06F 1/16* (2006.01)
(52) U.S. Cl. ................................ 361/679.59
(58) Field of Classification Search ............. 361/679.59
See application file for complete search history.

(56) References Cited

U.S. PATENT DOCUMENTS

| | | | | |
|---|---|---|---|---|
| 5,495,389 A * | 2/1996 | Dewitt et al. | ........... | 361/679.57 |
| 5,818,688 A * | 10/1998 | Gluskoter et al. | ...... | 361/679.09 |
| 6,414,842 B1 * | 7/2002 | Cipolla et al. | ......... | 361/679.46 |
| 6,498,719 B1 * | 12/2002 | Bridges | ................. | 361/679.34 |
| 6,654,237 B1 * | 11/2003 | Lee | ........................ | 361/679.55 |
| 7,079,383 B2 * | 7/2006 | Homer | ................... | 361/679.35 |
| 2006/0262498 A1 * | 11/2006 | Banko | ........................ | 361/683 |
| 2008/0074831 A1 * | 3/2008 | Lee et al. | .................... | 361/683 |
| 2008/0253081 A1 * | 10/2008 | Tracy et al. | ................. | 361/687 |

FOREIGN PATENT DOCUMENTS

| | | |
|---|---|---|
| JP | 2003-167644 | 6/2003 |
| JP | 2007-164884 | 6/2007 |

* cited by examiner

*Primary Examiner*—Lisa Lea-Edmonds
(74) *Attorney, Agent, or Firm*—Hamre, Schumann, Mueller & Larson, P.C.

(57) ABSTRACT

An information processing apparatus of the present invention includes a battery unit 4 capable of supplying electricity to a main body of the apparatus; a drive unit disposed at the bottom face of the casing 1 and capable of recording data to or reproducing data from an information medium; a cover 5 capable of covering the drive unit; and a plurality of foot portions 11 to 14 disposed at the bottom face of the casing 1. The battery unit 4 and the cover 5 are disposed adjacently along the plane of the bottom face of the casing 1. A foot portion 15 is provided at the bottom face of the battery unit 4 or the cover 5, and the foot portion 15 is disposed in the proximity of a region where the battery unit 4 and the cover 5 are facing each other. With such a configuration, even if a strong force is applied to the border portion between the cover and the battery unit, the casing can be prevented from being flexed, and the casing and an electric circuit board and the like built therein can be prevented from being damaged.

5 Claims, 6 Drawing Sheets

INFORMATION PROCESSING APPARATUS

BACKGROUND OF THE INVENTION

1. Field of the Invention

The present invention relates to an information processing apparatus such as a notebook personal computer (hereinafter referred to as a notebook PC). Particularly, the present invention relates to a casing structure of an information processing apparatus.

2. Description of Related Art

Nowadays, notebook PCs are becoming increasingly widespread, and in addition to various functions, notebook PCs with various forms are available on the market.

Notebook PCs are driven generally by electricity supplied from a rechargeable battery. The battery is detachable from a predetermined position in a notebook PC. Some recent notebook PCs include a detachable storage medium such as for example a hard disk drive (hereinafter referred to as an HDD) and a silicon disk drive built therein. For example, an HDD that is detachable from the notebook PC mainly is replaceable due to deterioration and damage, and mainly used for an increase in storage capacity and for a data transfer.

Figure 7:
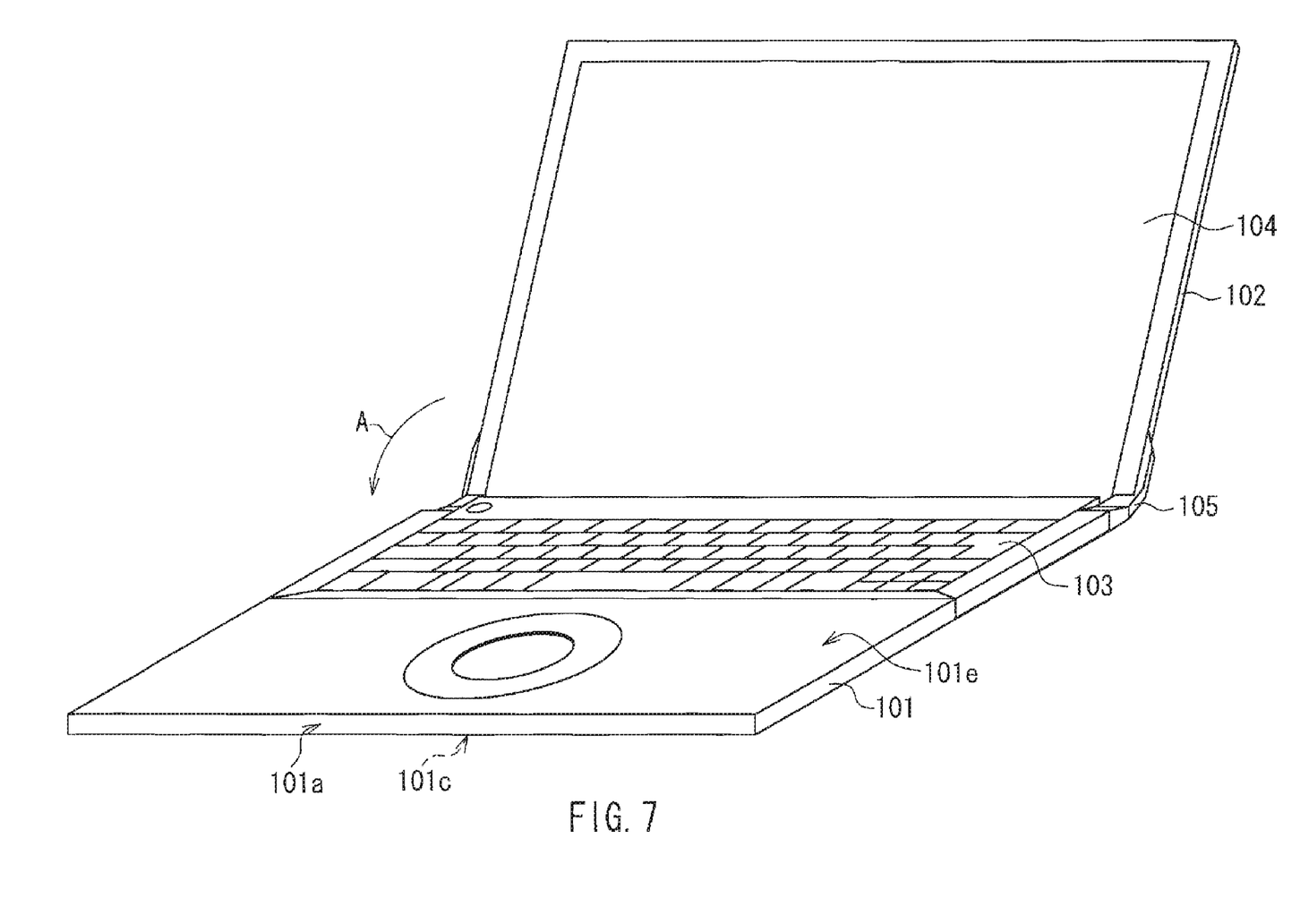
FIG. 7 is a perspective view illustrating a configuration of a conventional information processing apparatus.

FIG. 7 is a perspective view of a conventional notebook PC. The notebook PC shown in FIG. 7 is configured of a first casing 101 provided with a keyboard 103 and a central processing unit (CPU), and a second casing 102 provided with a liquid crystal monitor 104. The first casing 101 and the second casing 102 are supported pivotally by a hinge mechanism 105. Herein, the state of the notebook PC as shown in FIG. 7 is defined as a first state, and in a state defined as a second state, the liquid crystal monitor 104 is facing the keyboard 103 by allowing the second casing 102 to pivot in the direction indicated by arrow A from the first state.

Figure 1:
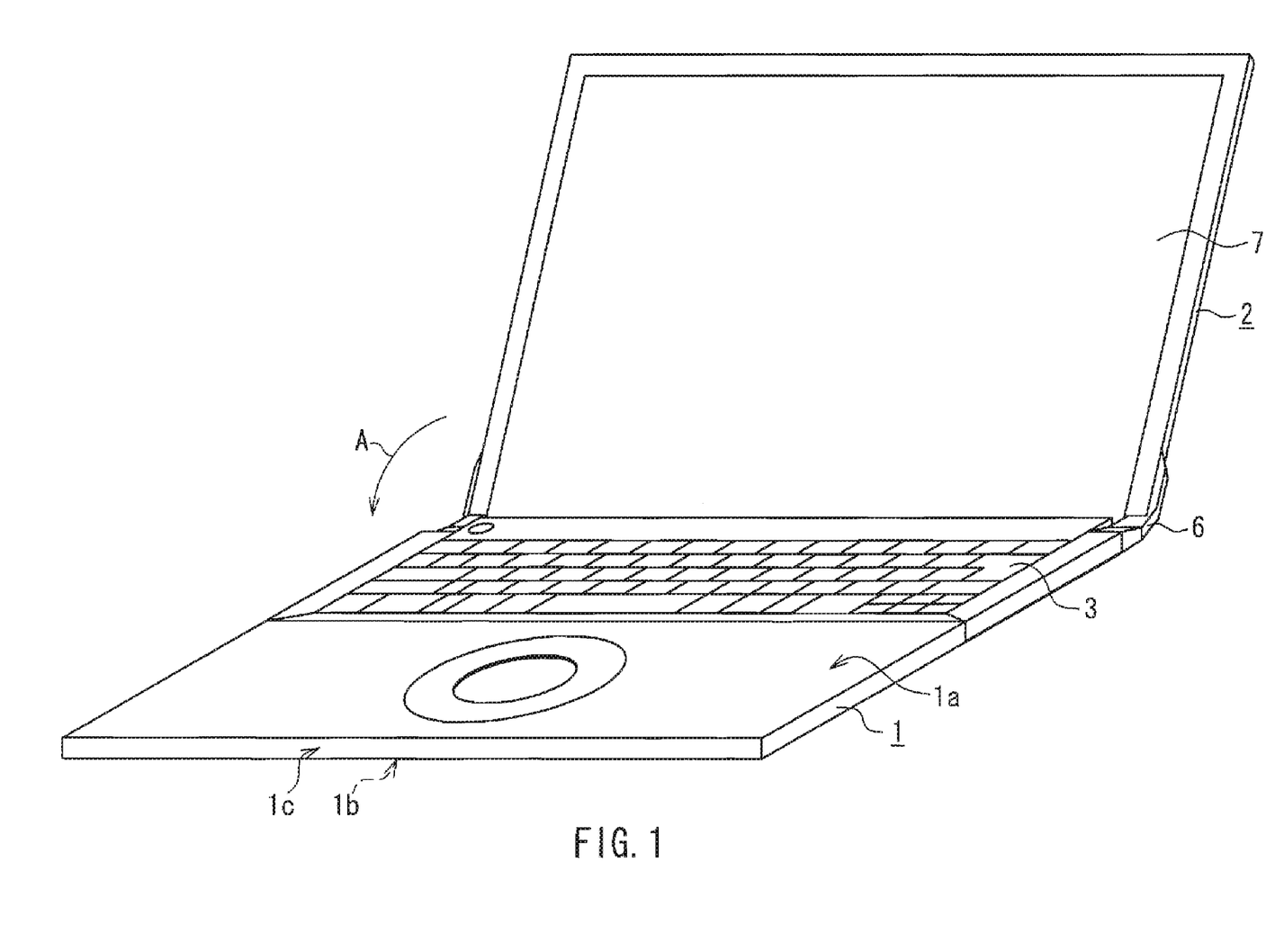
FIG. 1 is a perspective view illustrating an external view of an information processing apparatus in an embodiment.
Figure 8:
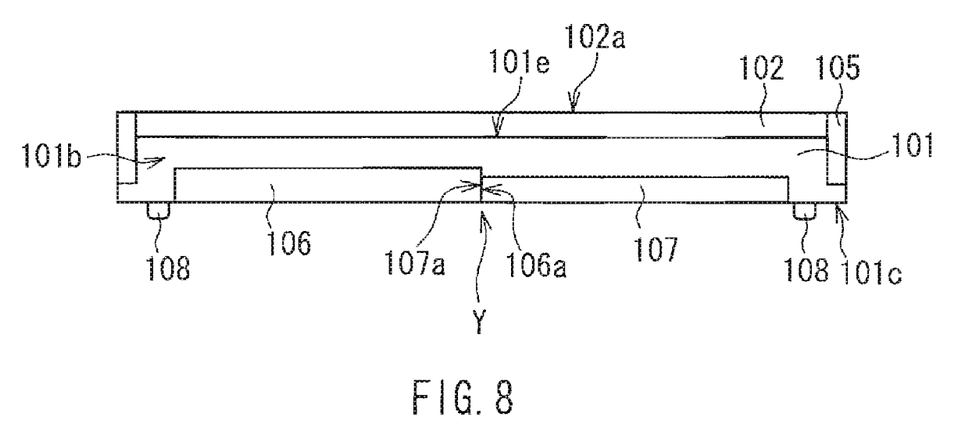
FIG. 8 is a rear elevation view of a conventional information processing apparatus.

FIG. 8 is a rear elevation view of a notebook PC in the second state. As shown in FIG. 8, a battery unit 106 and a cover 107 are disposed at a rear face 101b (rear face 101b is the opposite face to a front face 101a as shown in FIG. 1) and a bottom face 101c of a notebook PC. The battery unit 106 includes therein a rechargeable battery capable of supplying electricity to the notebook PC. The cover 107 is disposed so as to cover an HDD disposed therein. A side face 106a of the battery unit 106 and a side face 107a of the cover 107 are facing each other with a miniscule gap interposed therebetween.

On the bottom face 101c of the first casing 101, foot portions 108 formed of an elastic material such as rubber are disposed to protect the notebook PC from, for example, impact. The foot portions 108 are disposed in the proximity of each of the four corners on the bottom face 101c.

Patent Document 1 (JP 2003-167644A) discloses a configuration of a notebook PC having foot portions on the bottom face thereof. Patent Document 2 (JP 2007-164884A) discloses a configuration of a mobile phone in which the battery and the hard disk drive are slid along the plane so as to be disposed in a non-overlapped manner.

Figure 9:
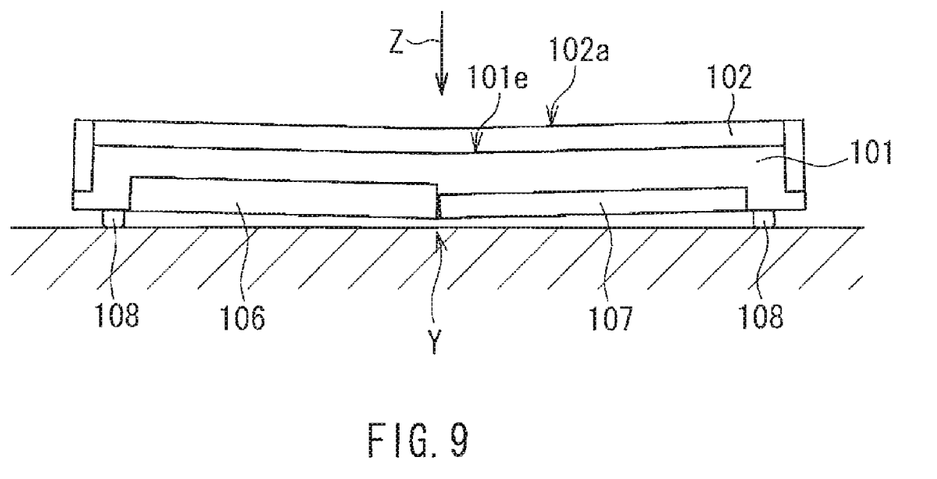
FIG. 9 is a rear elevation view illustrating a state in which a conventional information processing apparatus is flexed by a pressure application.

However, as shown in FIG. 8, when the cover 107 and the battery unit 106 are disposed side by side along the plane of the bottom face 101c of the first casing 101, along the border portion Y where the cover 107 and the battery unit 106 face each other, rigidity of the first casing 101 in the thickness direction thereof is insufficient. Therefore, when the notebook PC is dropped accidentally on the floor or the like, or when a strong pressure is applied on the upper face 101e of the first casing 101 or to the rear face 102a of the second casing 102 in the direction indicated by arrow Z, as shown in FIG. 9, flexing possibly is caused along border portion Y. Under such conditions, a problem arises, i.e., the first casing 101 and its built-in electric circuit board may be damaged.

SUMMARY OF THE INVENTION

Therefore, with the foregoing in mind, it is an object of the present invention to prevent flexing of the casing even if a strong force is applied to the border portion between the cover and the battery unit, and to prevent damage to the casing and the electric circuit board and the like built therein in a configuration in which the cover and the battery unit are disposed side by side along the plane of the bottom face of the casing.

An information processing apparatus of the present invention includes a casing; a battery unit disposed at the bottom face of the casing and capable of supplying electricity to the apparatus; a drive unit disposed at the bottom face of the casing and capable of recording data to or reproducing data from an information medium; a cover capable of covering the drive unit, a plurality of primary foot portions disposed at the bottom face of the casing; and a secondary foot portion provided at the bottom face of the battery unit or the cover, wherein the battery unit and the cover are disposed adjacently along the plane of the bottom face of the casing, and the secondary foot portion is disposed in the proximity of a region where the battery unit and the cover are facing each other.

According to the present invention, even if a strong force is applied to the border portion between the cover and the battery unit, the casing can be prevented from being flexed, and the casing and an electric circuit board and the like built therein can be prevented from being damaged.

DETAILED DESCRIPTION OF THE INVENTION

Hereinafter, the present invention will be described by way of illustrative embodiments with reference to the drawings.

An information processing apparatus of the present invention may be embodied as in the following with the above-described configuration as the basic configuration. That is, an information processing apparatus of the present invention may be configured so that the height of the secondary foot portion from the bottom face of the casing is the same as the height of the primary foot portion. With such a configuration, rocking of the information processing apparatus can be curbed when the information processing apparatus is placed on a plane such as a desk top, and it can be placed stably.

Furthermore, the information processing apparatus of the present invention may be configured so that the height of the secondary foot portion from the bottom face of the casing is shorter than the height of the primary foot portion. With such a configuration, rocking of the information processing apparatus can be curbed when the information processing apparatus is placed on a plane such as a desk top, and it can be placed stably. Also, since the positional precision and the dimensional precision of only the primary foot portion are necessary, manufacturing of the information processing apparatus can be improved.

Furthermore, in the information processing apparatus of the present invention, the secondary foot portion may be configured so that its end portion has a curved face. With such a configuration, when the information processing apparatus is placed in a case or in a bag, it can be put in smoothly since the secondary foot portion will not get caught easily in the case and the like.

Furthermore, the information processing apparatus of the present invention may be configured so that the drive unit is integrated with the cover. Even with such a configuration in which the drive unit and the cover are not separated but integrated, by providing the secondary foot portion to the drive unit, rocking of the information processing apparatus can be curbed when the information processing apparatus is placed on a plane such as a desk top, and it can be placed stably.

Embodiment

FIG. 1 is a perspective view illustrating an external view of a notebook PC as an example of an information processing apparatus in an embodiment.

As shown in FIG. 1, the notebook PC is configured of a first casing 1 and a second casing 2. The first casing 1 is provided with a keyboard 3 on an upper face 1a thereof, and a central processing unit (CPU), an electric circuit board, and so on are built therein. The second casing 2 is provided with a liquid crystal monitor 7. The first casing 1 and the second casing 2 are formed of a resin or a light metal (for example, any of aluminum, magnesium, an aluminum alloy, and a magnesium alloy). The first casing 1 and the second casing 2 are coupled by a hinge mechanism 6 so as to pivot in the direction indicated by arrow A and its reverse direction. The state shown in FIG. 1 is defined as a "first state" and in a state defined as a "second state", the liquid crystal monitor 7 is facing the keyboard 3 with a miniscule gap interposed therebetween, by allowing the second casing 2 to pivot in the direction indicated by arrow A from the first state as shown in FIG. 1.

Figure 2:
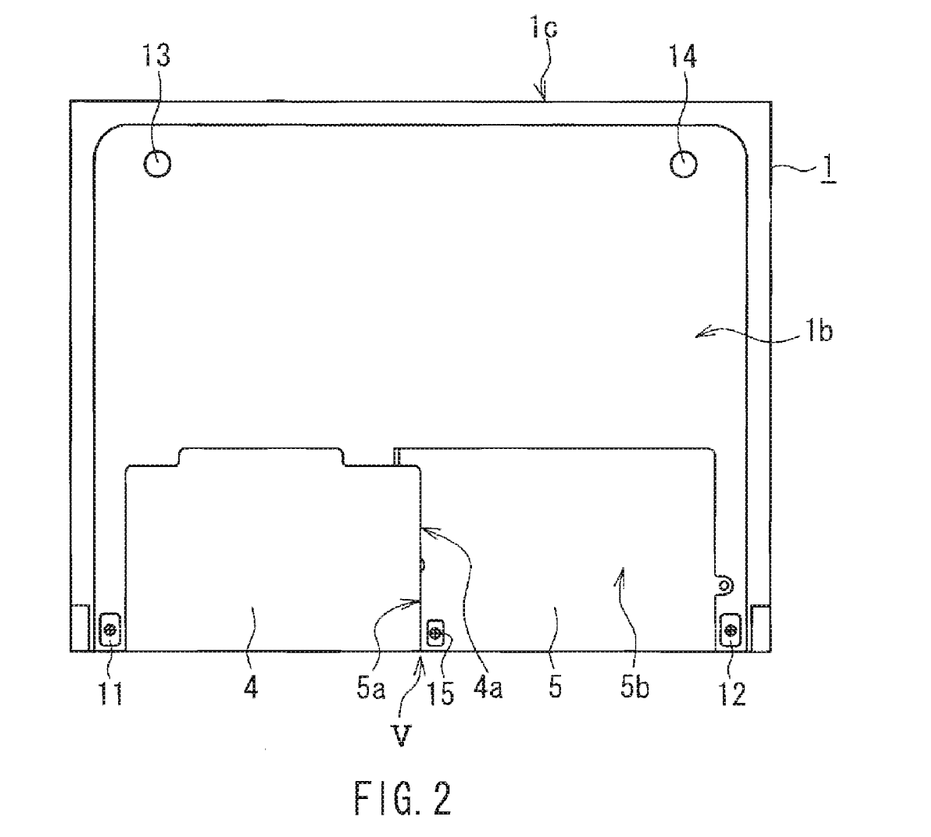
FIG. 2 is a plan view illustrating a configuration of a bottom face of a first casing.
Figure 3:
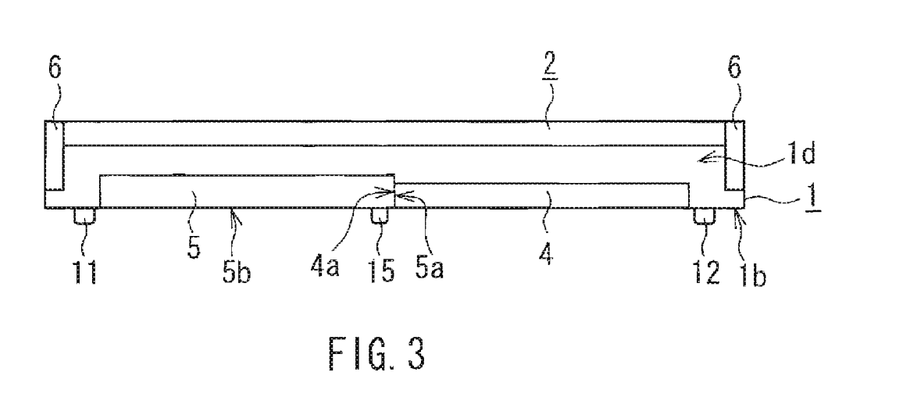
FIG. 3 is a rear elevation view illustrating a configuration of a first casing at a rear face side when the information processing apparatus is in a second state.

FIG. 2 is a plan view illustrating a configuration of a bottom face 1b of the first casing 1. FIG. 3 is a rear elevation view illustrating a configuration of the first casing 1 at a side of a rear face 1d when the notebook PC is in the second state. As shown in FIGS. 2 and 3, on the bottom face 1b of the first casing 1, foot portions 11, 12, 13, and 14 are disposed in the proximity of the four corners thereof to ease the impact applied to the notebook PC.

The foot portions 11 to 14 are formed of an elastic resin such as an elastomer. The foot portions 11 to 14 are fixed to the first casing 1 by a fixing means, for example, by fastening with a screw, bonding with an adhesive, and securing with a nail. The height of the foot portions 11 to 14 from the bottom face 1b is set so that the posture of the notebook PC is not unstable when the notebook PC is placed on a desk top for example. Also, in this embodiment, the foot portions 11 and 12 are formed substantially in the shape of a semicircular column. The foot portions 13 and 14 are formed substantially in the shape of a column. These forms of the foot portions 11 to 14 are examples.

The first casing 1 is provided with a battery unit 4 and a hard disk drive cover 5 (hereinafter referred to as cover 5). The battery unit 4 and the cover 5 are disposed so as to form a part of the bottom face 1b and the rear face 1d of the first casing 1. The battery unit 4 and the cover 5 are disposed side by side along the plane of the bottom face 1b. The battery unit 4 and the cover 5 are detachable from the first casing 1. The battery unit 4 includes a built-in rechargeable battery capable of supplying electricity to the notebook PC. An HDD is disposed in the cover 5, so that the HDD is protected from impact reaching it through the cover. At a bottom face 5b of the cover 5, a foot portion 15 is disposed.

Figure 4:
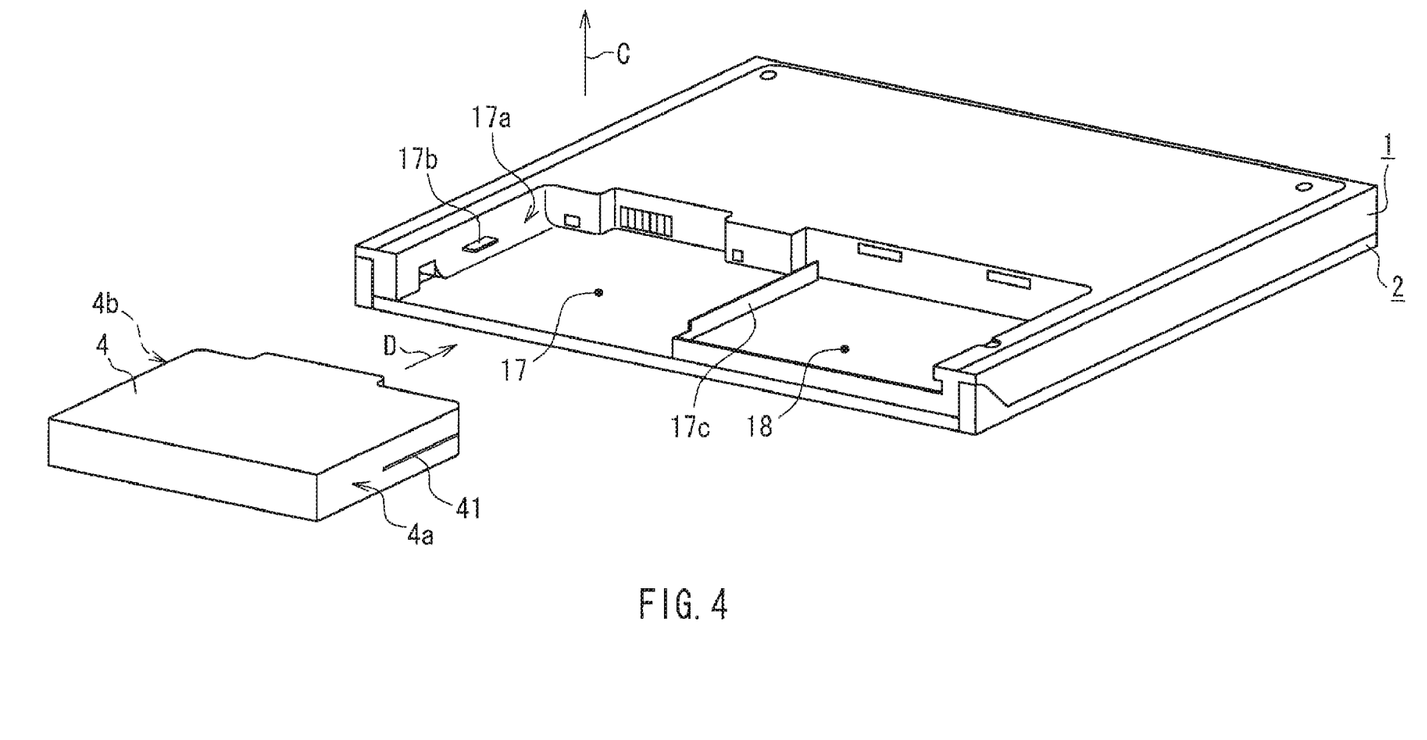
FIG. 4 is a perspective view illustrating a state in which a battery is removed from an information processing apparatus.

FIG. 4 illustrates a state in which the battery unit 4, the cover 5, and the HDD (not shown) are removed from the notebook PC. As shown in FIG. 4, a groove portion 41 is formed on a side face 4a of the battery unit 4. A groove portion (not shown) having the same configuration as that of the groove portion 41 also is formed on a side face 4b, i.e., the other side from the side face 4a. A first rib 17b is formed on an internal face 17a of a battery attachment portion 17 in the notebook PC. A second rib (not shown) having the same configuration as that of the first rib 17b is also formed at a wall portion 17c arranged to stand between the battery attachment portion 17 and an HDD attachment portion 18, at a face thereof opposing the internal face 17a. The first rib 17b and the second rib formed at the opposite position are formed like a thin plate, and have at least a thickness that can be fitted in the groove portion 41. When the battery unit 4 is attached to the battery attachment portion 17, by allowing the first rib 17b to fit in the groove portion formed at the side face 4b and allowing the second rib formed at the position opposing the first rib 17b to fit in the groove portion 41, the battery unit 4 attached to the battery attachment portion 17 can be prevented from being detached in the direction indicated by arrow C.

The foot portion 15 is disposed at a position on the bottom face 5b of the cover 5 in the proximity of the battery unit 4. The foot portion 15 is formed of an elastic resin such as an elastomer. FIG. 6 is an enlarged perspective view in the proximity of the foot portion 15. As shown in FIG. 6, the foot portion 15 is formed substantially in a shape of a semicircular column. In the foot portion 15, an aperture 15b for inserting a screw 16 is formed at an upper face 15a. The foot portion 15 is fixed to the cover 5 by the screw 16. The end portion of the foot portion 15 is slightly lower than the end portions of the foot portions 11 and 12. In this embodiment, the bottom face 5b of the cover 5 is flush with the bottom face 1b of the first casing 1, and a height from the bottom face 5b to the end portion of the foot portion 15 is shorter than the height from the bottom face 1b to the end portions of the foot portions 11 and 12. Therefore, as shown in FIG. 5, when the notebook PC is placed on a plane such as a desk, the foot portions 11 and 12 are in contact with the top of the desk, but there is gap W between the foot portion 15 and the desk top.

In the following, behavior of a notebook PC in this embodiment in a case where an impact is given is described.

Figure 5:
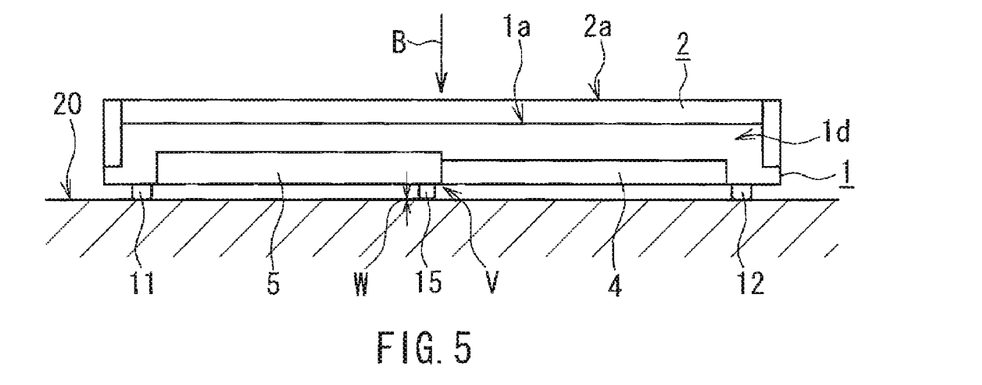
FIG. 5 is a rear elevation view illustrating a state in which an information processing apparatus is placed on a desk top.
Figure 6:
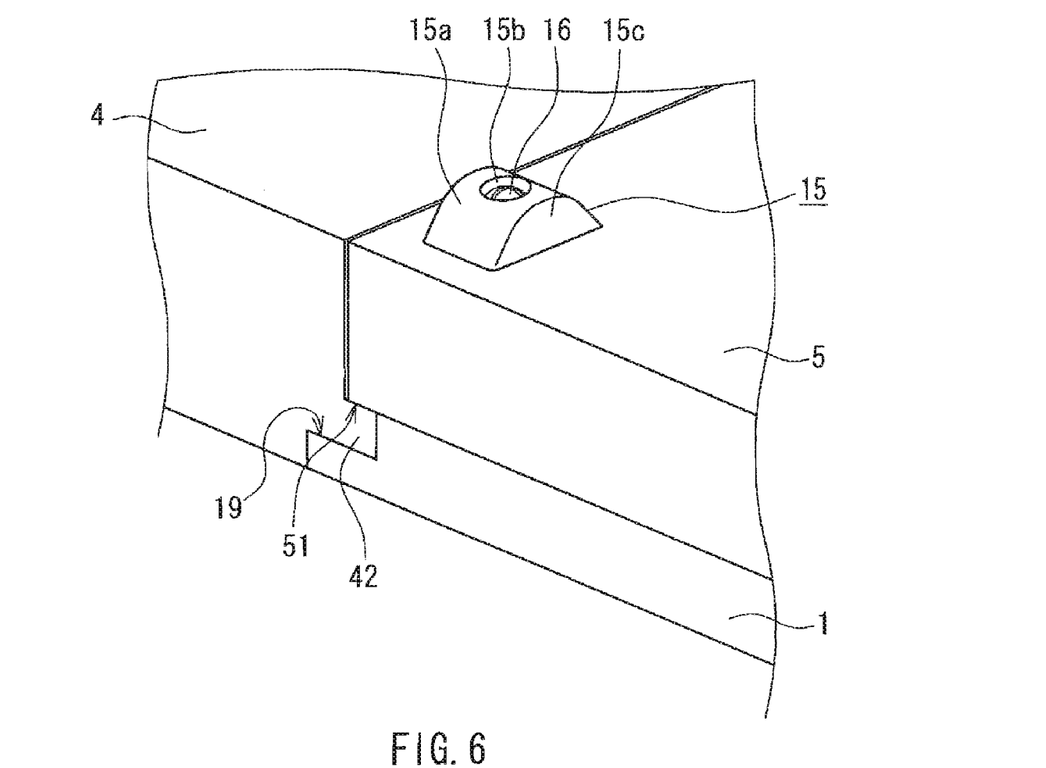
FIG. 6 is a perspective view of a relevant part in the proximity of a secondary foot portion.

As shown in FIG. 5, in the notebook PC in this embodiment, a miniscule gap is present at border portion V where the side face 4a of the battery unit 4 and the side face 5a of the cover 5 are facing each other, and the side face 4a and the side face 5a are not connected. Therefore, when a notebook PC is dropped accidentally on a floor or the like, or when a pressure is applied to the upper face 1a of the first casing 1 or the upper face 2a of the second casing 2 in the direction indicated by arrow B while the notebook PC is being placed on a desk or the like, the first casing 1 is caused to flex along border portion V.

In this embodiment, the foot portion 15 is providing on the proximity of border portion V, the end portion of the foot portion 15 abuts on a plane 20 when a force is applied to the notebook PC in the direction indicated by arrow B and causes the first casing 1 is to flex in the direction indicated by arrow B. This restrains the first casing 1 from being flexed excessively.

According to this embodiment, the foot portion 15 is providing on the proximity of border portion V between the battery unit 4 and the cover 5, even if a force is applied to the first casing 1 in the direction indicated by arrow B, the first casing 1 can be prevented from being flexed excessively. Therefore, the first casing 1 and various components such as an electric circuit board built therein can be prevented from being damaged.

Furthermore, by setting the height of the foot portion 15 to be shorter than the height of the foot portions 11 to 14, when the notebook PC is placed on a plane such as a desk top, the foot portions 11 to 14 abut on the desk top. Therefore, in addition to the fact that the position of the notebook PC is stabilized, the foot portion 15 abuts on the desk top only when a force is applied to the first casing 1 in the direction indicated by arrow B, thereby preventing flexing of the first casing 1. That is, when the foot portion 15 is formed so as to make the height of the foot portion 15 the same as the height of the foot portions 11 to 14, sometimes height of the foot portion 15 is made higher than that of the foot portions 11 to 14 due to non-uniform working precision of the foot portion 15. This causes the posture of the notebook PC to be unstable. Therefore, by forming the foot portion 15 to have a height shorter than the height of the foot portions 11 to 14 as in this embodiment, even if there is a slight variation in size precision in the foot portion 15, the possibility for the foot portion 15 to be higher than the foot portions 11 to 14 becomes quite low. Therefore, the position of the notebook PC can be stabilized.

Furthermore, with a configuration in which the foot portion 15 is fixed to the cover 5 with a screw 16 as in this embodiment, it can be fixed strongly to the cover 5.

Furthermore, since the foot portion 15 has the upper face 15a of a curved shape in this embodiment, when the notebook PC is placed in a case or in a bag, it can be put in and out smoothly without being caught on an internal face of the case or the like.

Although the foot portion 15 has substantially a semicircular column shape as shown in FIG. 6 in this embodiment, the shape may be different as long as the flexing in the proximity of border portion V can be curbed when a force is applied in the direction which causes the first casing 1 and the second casing 2 to flex. For example, the foot portion 15 also may be formed in a cylindrical shape with a small external diameter.

Furthermore, although the height of the foot portion 15 is set to be shorter than the height of the foot portions 11 to 14 in this embodiment, the height of these foot portions may be the same. By setting the height of the foot portion 15 to the same as the height of the foot portions 11 to 14, the notebook PC can be placed on a desk upper surface or the like without rocking. Also, even when a force is applied to the first casing 1 in the direction indicated by arrow B, the foot portion 15 abuts on the desk top, thereby preventing the first casing 1 from being flexed.

Furthermore, as shown in FIGS. 2 and 3, the foot portion 15 is positioned at approximately center on a straight line connecting the foot portion 11 and the foot portion 12 in this embodiment. Such a configuration is preferable for the purpose of preventing flexing of the first casing 1, but for the purpose of reinforcing a portion where the rigidity is insufficient such as border portion V, the position of the foot portion 15 does not have to be at the center. For example, in a configuration shown in FIG. 2 and FIG. 3, the width of the battery unit 4 and the width of the cover 5 are almost the same, but when the width of the battery unit 4 is about twice the width of the cover 5, the position of border portion V will be at a position nearer to the foot portion 12 than the foot portion 11. According to such a configuration, the foot portion 15 preferably is disposed in the proximity of border portion V, not at the center on a straight line connecting the foot portion 11 and the foot portion 12.

Furthermore, in a description given in this embodiment, flexing of the first casing 1 can be prevented at the foot portion 15 when the notebook PC is in the second state as shown in FIG. 5, but even when a strong pressure is applied to the upper face 1a and to the keyboard 3 when the notebook PC is in the first state as shown in FIG. 1, the foot portion 15 abuts on a desk top and the like, restraining flexing of the first casing 1.

Furthermore, although the cover 5 was formed as a member separate from the HDD in this embodiment, the cover 5 may be integrated with the HDD. That is, the cover 5 is not essential, as long as the functions of the cover 5 are provided in the HDD. For example, in another possible configuration, a drive unit having a bottom face with its contour substantially coinciding with the bottom face of the first casing 1 is provided, and the foot portion 15 is provided at the bottom face of the drive unit.

Furthermore, although the battery unit 4 and the cover 5 are configured in such a fashion that they are detachable from the first casing 1 in this embodiment, they may be fixed individually to the first casing 1. In such a case, when the battery unit 4 and the cover 5 are not connected in that configuration, since the rigidity is low in the region where the battery unit 4 and the cover 5 are facing, the rigidity of the first casing 1 can be improved by providing the foot portion 15 in the proximity of such a region where they are facing.

The foot portions 11 to 14 in this embodiment are an example of the primary foot portion in the present invention. The foot portion 15 in this embodiment is an example of the secondary foot portion in the present invention.

Although a preferable example of a configuration for holding the battery unit 4 is shown in this embodiment, i.e., the battery unit 4 is held in the battery attachment portion 17 of the notebook PC by allowing the first rib 17b to fit in the groove portion 41, the configuration as shown in FIG. 6 may also be used. In the configuration shown in FIG. 6, a projected portion 42 formed at the side face 4a of the battery unit 4 is sandwiched by a regulating portion 51 of the cover 5 and a regulating portion 19 formed at the first casing 1 to hold the battery unit 4 in the battery attachment portion 17. With the configuration shown in FIG. 6, the first rib 17b and the groove portion 41 are unnecessary. When an impact is given for example in the direction indicated by arrow B in FIG. 5 in the configuration shown in FIG. 6, the impact can be received by the regulating portion 19, the projection portion 42, the regulating portion 51, and the foot portion 15, and the first casing 1 can be prevented from being flexed excessively.

Although a notebook PC is used for describing an example of an information processing apparatus in this embodiment, the same effects as those of this embodiment can be obtained as long as the battery and the disk drive that are detachable from a main body of an apparatus are provided in the configuration. Examples of such an information processing apparatus include, for example, PDA (personal digital assistance), mobile game consoles, and mobile medical devices.

An information processing apparatus of the present invention is suitably used for notebook PCs and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing apparatus comprising:
   a casing;
   a battery unit disposed at the bottom face of the casing and capable of supplying electricity to the apparatus;
   a drive unit disposed at the bottom face of the casing and capable of recording data to or reproducing data from an information medium;
   a cover capable of covering the drive unit,
   a plurality of primary foot portions disposed at the bottom face of the casing; and
   a secondary foot portion provided at the bottom face of the battery unit or the cover,
   wherein the battery unit and the cover are disposed adjacently along the plane of the bottom face of the casing, and
   the secondary foot portion is disposed in the proximity of a region where the battery unit and the cover are facing each other.

2. The information processing apparatus according to claim 1, wherein the height of the secondary foot portion from the bottom face of the casing is equal to the height of the primary foot portion.

3. The information processing apparatus according to claim 1, wherein the height of the secondary foot portion from the bottom face of the casing is shorter than the height of the primary foot portion.

4. The information processing apparatus according to claim 1, wherein the secondary foot portion has an end portion of a curved face.

5. The information processing apparatus according to claim 1, wherein the drive unit is integrated with the cover.

* * * * *